(12) United States Patent
Kim et al.

(10) Patent No.: US 9,392,609 B2
(45) Date of Patent: Jul. 12, 2016

(54) METHOD AND APPARATUS FOR REMOVING INTER-HETEROGENEOUS CELL INTERFERENCE

(75) Inventors: Hyung Tae Kim, Anyang-si (KR); Han Byul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1022 days.

(21) Appl. No.: 13/516,072

(22) PCT Filed: Dec. 15, 2010

(86) PCT No.: PCT/KR2010/008960
§ 371 (c)(1),
(2), (4) Date: Jun. 14, 2012

(87) PCT Pub. No.: WO2011/074865
PCT Pub. Date: Jun. 23, 2011

(65) Prior Publication Data
US 2012/0258724 A1 Oct. 11, 2012

Related U.S. Application Data

(60) Provisional application No. 61/286,391, filed on Dec. 15, 2009, provisional application No. 61/292,493, filed on Jan. 6, 2010, provisional application No. 61/312,229, filed on Mar. 9, 2010.

(51) Int. Cl.
*H04W 72/08* (2009.01)
*H04L 1/00* (2006.01)
(Continued)

(52) U.S. Cl.
CPC ............ *H04W 72/082* (2013.01); *H04L 1/0003* (2013.01); *H04L 1/0009* (2013.01); *H04L 1/0015* (2013.01); *H04L 1/16* (2013.01); *H04W 72/0406* (2013.01); *H04W 84/045* (2013.01)

(58) Field of Classification Search
CPC ..... H04W 16/00; H04W 16/02; H04W 16/10; H04W 16/12; H04W 16/14; H04W 28/16; H04W 72/04; H04W 72/082
USPC ....................................................... 455/452.2
See application file for complete search history.

(56) References Cited

U.S. PATENT DOCUMENTS

2004/0233888 A1 * 11/2004 Bonta .................. H04W 16/14
370/350
2009/0196245 A1 * 8/2009 Ji .................................. 370/329
(Continued)

OTHER PUBLICATIONS

Alcatel-Lucent et al., "Technology Issues for Heterogeneous Network for LTE-A," 3GPP TSG RAN WG1 #58bis, Miyazaki, Japan, Oct. 12-16, 2009, R1-093788, pp. 1-5.
(Continued)

*Primary Examiner* — Christopher M Brandt
(74) *Attorney, Agent, or Firm* — Birch, Stewart, Kolasch & Birch, LLP

(57) ABSTRACT

Disclosed are a method and apparatus for removing inter-heterogeneous cell interference. A terminal apparatus for removing inter-heterogeneous cell interference comprises: a receiver which receives, from a first base station which is a serving base station, a signal for instructing that a request for interference coordination information required for inter-heterogeneous cell interference coordination be made to a second base station which is heterogeneous to the first base station; a transmitter which transmits, to the second base station, a predetermined physical random access channel (PRACH) preamble which notifies said request through a PRACH; a receiver which receives the interference coordination information from the second base station; and a transmitter which transmits the received interference coordination information to the first base station.

13 Claims, 8 Drawing Sheets

(51) Int. Cl.
*H04W 72/04* (2009.01)
*H04W 84/04* (2009.01)
*H04L 1/16* (2006.01)

(56) References Cited

U.S. PATENT DOCUMENTS

| | | |
|---|---|---|
| 2009/0197631 A1 | 8/2009 | Palanki et al. |
| 2010/0120445 A1* | 5/2010 | Li .................... H04W 28/24 455/452.2 |
| 2010/0216482 A1* | 8/2010 | Hoole ................ H04W 72/087 455/450 |
| 2011/0105135 A1* | 5/2011 | Krishnamurthy et al. .... 455/450 |

OTHER PUBLICATIONS

Catt, "Scenarios analysis and key study aspects consideration for heterogeneous networks," 3GPP TSG RAN WG1 meeting #58bis, Miyazaki, Japan, Oct. 12-16, 2009, R1-094326, 7 pages.

Kyocera, "Downlink Interference Coordination Assisted by Network between Home eNodeB and Macro eNodeB for LTE-Advanced," 3GPP TSG-RAN WG1 #59, Jeju, Korea, Nov. 9-13, 2009, R1-094778, pp. 1-8.

* cited by examiner

METHOD AND APPARATUS FOR REMOVING INTER-HETEROGENEOUS CELL INTERFERENCE

CROSS REFERENCE TO RELATED APPLICATIONS

This application is the National Phase of PCT/KR2010/008960 filed on Dec. 15, 2010, which claims priority under 35 U.S.C. 119(e) to U.S. Provisional Application No. 61/286,391 filed on Dec. 15, 2009, U.S. Provisional Application No. 61/292,493 filed on Jan. 6, 2010 and U.S. Provisional Application No. 61/312,229 filed on Mar. 9, 2010, all of which are hereby expressly incorporated by reference into the present application.

TECHNICAL FIELD

The present invention relates to a wireless communication system, and more particularly, to a method and apparatus for removing inter-heterogeneous cell interference in a wireless communication system.

BACKGROUND ART

3GPP discusses a heterogeneous network. The heterogeneous network includes various types of cells (e.g. a macro cell, a femto cell, etc.) which coexist and operate therein. In the heterogeneous network, many nodes with low transmit power are located in an overlapping manner in the coverage of a macro cell. Examples of the nodes include a pico cell, a micro cell, a femto cell, a home eNB, etc. Since it is difficult for the conventional macro cell or micro cell division technology to meet increasing demands for data service, the heterogeneous network is constructed in such a manner that services are provided to small indoor and outdoor areas using a low-power pico cell, femto cell, relay node and the like to enable capacity increase at a low cost.

Although system capacity considerably increases in the heterogeneous network, there are many problems to be solved, such as a cell recognition problem due to shortage of cell IDs, the imbalance between an uplink coverage and a downlink coverage caused by different transmit powers of cells, and interference between a macro cell and a small cell or between small cells.

Among these problems, there has not yet been proposed solution to the interference between a macro cell and other heterogeneous cells, which affects a user equipment (UE) located at a cell boundary.

DETAILED DESCRIPTION OF THE INVENTION

Technical Problems

An object of the present invention is to provide a method for removing inter-heterogeneous cell interference.

Another object of the present invention is to provide an apparatus for removing inter-heterogeneous cell interference.

Technical problems to be solved by the present invention are not limited to the above-mentioned technical problem, and other technical problems not mentioned above can be clearly understood by one skilled in the art from the following description.

Technical Solutions

In an aspect of the present invention, a method for removing inter-heterogeneous cell interference includes: receiving, at a first type user equipment (UE) from a first eNode B (eNB) which is a serving eNB, a signal for instructing that a request for interference coordination information required for inter-heterogeneous cell interference coordination to a second eNB, wherein the first eNB is a heterogeneous to the second eNB; transmitting, at the first type UE to the second eNB, a predetermined physical random access channel (PRACH) preamble which notifies the request through a PRACH; receiving, at the first type UE, the interference coordination information from the second eNB; transmitting, at the first type UE, the received interference coordination information to the first eNB.

The interference coordination information may include information on time and frequency resources allocated to a second type UE, which is subjected to interference of a predetermined threshold or higher from the first eNB, from among one or more second type UEs served by the second eNB.

The method may further include receiving downlink data from the first eNB through a resource region corresponding to time and frequency resources which are scheduled by the first eNB on the basis of the interference coordination information.

The predetermined PRACH preamble may be allocated dedicatedly for the first type UE. The first type UE and the first eNB may respectively correspond to a femto UE and a femto eNB, and the second type UE and the second eNB may respectively correspond to a macro UE and a macro eNB.

In another aspect of the present invention, a method for removing inter-heterogeneous cell interference includes: transmitting, at a first eNB to a first type UE served by the first eNB, a signal for instructing that a request for interference coordination information required for inter-heterogeneous cell interference coordination to a second eNB, wherein the second eNB is heterogeneous to the first eNB; receiving, at the first eNB, the interference coordination information from the first type UE; and performing, at the first eNB, scheduling for one or more first type UEs on the basis of the received interference coordination information.

In another aspect of the present invention, an UE apparatus for removing inter-heterogeneous cell interference, includes: a receiver configured to receive, from a first eNB which is a serving eNB, a signal for instructing that a request for interference coordination information required for inter-heterogeneous cell interference coordination be a second eNB, wherein the first eNB is heterogeneous to the second eNB; a transmitter configured to transmit, to the second eNB, a predetermined PRACH preamble which notifies the request through a PRACH; a receiver configured to receive the interference coordination information from the second eNB; and a transmitter configured to transmit the received interference coordination information to the first eNB.

The UE apparatus may further include a receiver configured to receive downlink data from the first eNB through a resource region corresponding to time and frequency resources which are scheduled by the first eNB on the basis of the interference coordination information.

In another aspect of the present invention, an eNB apparatus for removing inter-heterogeneous cell interference includes: a transmitter configured to transmit, to a first type UE served by an eNB corresponding to the eNB apparatus, a signal for instructing that a request for interference coordination information required for inter-heterogeneous cell interference coordination to a second eNB wherein the eNB is heterogeneous to the second eNB; a receiver configured to receive the interference coordination information from the first type UE; and a processor configured to perform scheduling for one or more first type UEs on the basis of the received interference coordination information.

The eNB apparatus may further include a transmitter configured to transmit downlink data to the first type UE through a resource region corresponding to time and frequency resources which are scheduled on the basis of the interference coordination information.

Advantageous Effects

The method and apparatus for removing inter-heterogeneous cell interference according to embodiments of the present invention can increase transmission capacity by efficiently removing or mitigating inter-heterogeneous cell inference to thereby remarkably improve communication performance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the Drawings.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. For example, while the following detailed description includes specific details in order to provide a thorough understanding of the present invention, it will be apparent to those skilled in the art that the present invention may be practiced without such specific details. For example, the following detailed description is given under the assumption that a 3GPP LTE mobile communication system is being used. However, the description is applicable to any other mobile communication system except for specific features inherent to the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), an Advanced Mobile Station (AMS), etc. and the term 'Base Station (BS)' is assumed to refer to any node of a network end, such as a Node B, an enhanced Node B (eNB or eNode B), an Access Point (AP), etc., communicating with a UE.

In a mobile communication system, a UE may receive information from an eNode B on a downlink and transmit information to the eNode B on an uplink. The information that the UE transmits or receives includes data and various types of control information. There are many physical channels according to the types and usages of information that the UE transmits or receives.

Figure 1:
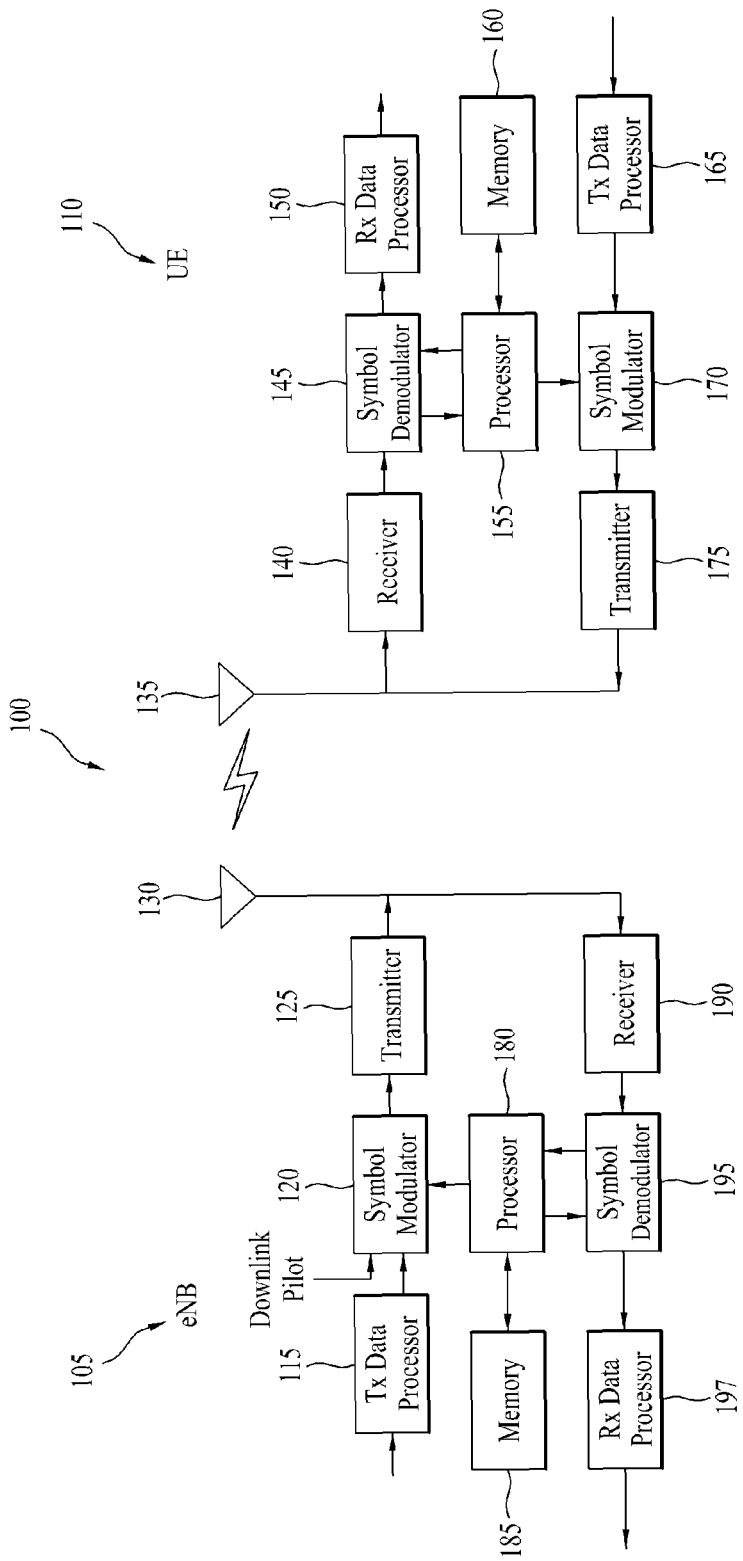
FIG. 1 is a block diagram of an eNode B (eNB) 105 and a user equipment (UE) 110 in a wireless communication system 100.

FIG. 1 is a block diagram of an eNode B (eNB) 105 and a user equipment (UE) 110 in a wireless communication system 100.

While one eNB 105 and one UE 110 are shown in FIG. 1 to simplify the configuration of the wireless communication system 100, the wireless communication system 100 obviously may include a plurality of eNBs and/or a plurality of UEs. That is, the eNB 105 includes various types of eNBs such as a macro eNB, a femto eNB, etc. and the UE 110 includes various types of UEs such as a macro UE, a femto UE, etc.

Referring to FIG. 1, the eNB 105 may include a transmission (Tx) data processor 115, a symbol modulator 120, a transmitter 125, a Transmission/Reception (Tx/Rx) antenna 130, a processor 180, a memory 185, a receiver 190, a symbol demodulator 195, and a reception (Rx) data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the eNB 105 and the UE 110, they include multiple antennas. Hence, the eNB 105 and the UE 110 support a Multiple Input Multiple Output (MIMO) system, specifically both Single User-MIMO (SU-MIMO) and Multi User-MIMO (MU-MIMO) in the present invention.

On the downlink, the Tx data processor 115 receives traffic data, processes the received traffic data through formatting, coding, interleaving, and modulation (i.e. symbol mapping), and thus outputs modulated symbols ("data symbols"). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a null signal value. Pilot symbols may be transmitted successively during each symbol period. The pilot symbols may be Frequency Division Multiplexing (FDM) symbols, Orthogonal Frequency Division Multiplexing (OFDM) symbols, Time Division Multiplexing (TDM) symbols, or Code Division Multiplexing (CDM) symbols.

The transmitter 125 converts the symbol stream into one or more analog signals and generates a downlink signal suitable for transmission over a radio channel by additionally processing (e.g. amplifying, filtering, and frequency-upconverting) the analog signals. The downlink signal is transmitted to the UE 110 through the antenna 130.

The UE 110 receives the downlink signal from the eNB 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

In addition, the symbol demodulator 145 receives a frequency response estimate of the downlink from the processor 155 and acquires data symbol estimates (i.e. estimates of the transmitted data symbols) by demodulating the received data symbols using the frequency response estimate. The Rx data processor 150 demodulates the data symbol estimates (i.e. performs symbol demapping), deinterleaves the demodulated data symbols, and decodes the deinterleaved data symbols, thereby recovering the traffic data transmitted by the eNB 105.

The operations of the symbol demodulator 145 and the Rx data processor 150 are complementary to the operations of the symbol modulator 120 and the Tx data processor 115 of the eNB 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the eNB 105 through the antenna 135.

The eNB 105 receives the uplink signal from the UE 110 through the antenna 130. In the eNB 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control (e.g. adjust, manage, etc.) operations of the UE 110 and the eNB 105. The processors 155 and 180 may be connected respectively to the memories 160 and 185 that store program codes and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination of them. When embodiments of the present invention are implemented using hardware, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention may be included in the processors 155 and 180.

On the other hand, if the embodiments of the present invention are implemented using firmware or software, the firmware or software may be configured to include a module, a procedure, a function, etc. which perform functions or operations according to the present invention. The firmware or software may be included in the processors 155 and 180, or stored in the memories 160 and 185 and invoked from the memories 160 and 185 by the processors 155 and 180.

The layers of radio interface protocols between a UE/eNB and a wireless communication system (network) may be classified into Layers 1, 2 and 3 (L1, L2 and L3) based on the three lowest layers of the Open System Interconnection (OSI) model. A physical layer corresponds to L1 and provides an information transmission service on physical channels. A Radio Resource Control (RRC) layer corresponds to L3 and provides radio control resources between the UE and the network. The UE/eNB and the network exchange RRC messages through the RRC layers.

Figure 2:
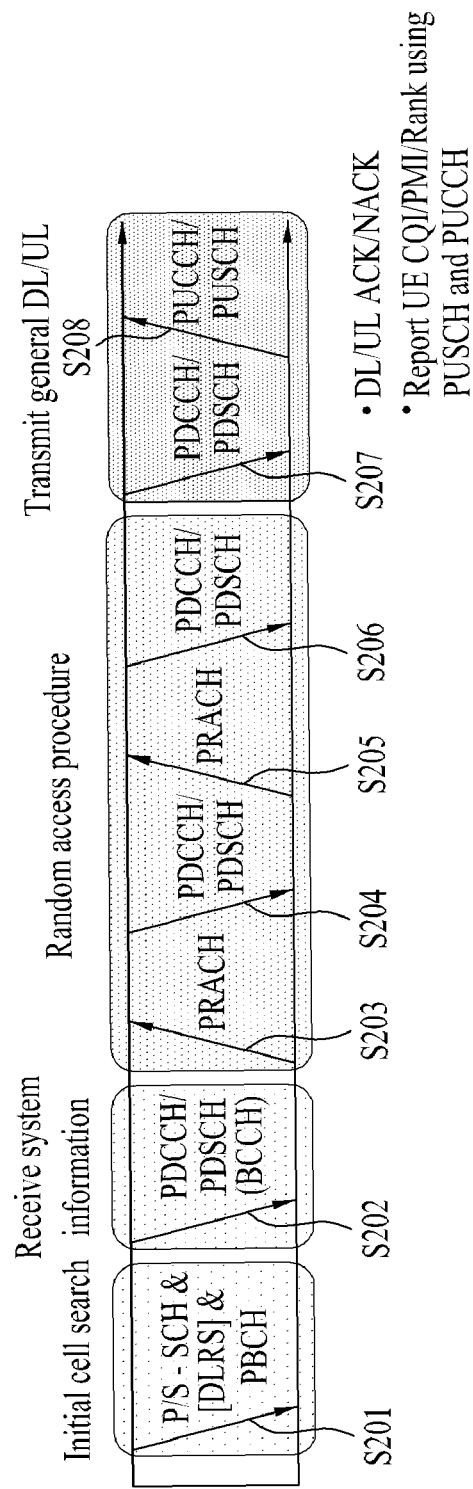
FIG. 2 illustrates physical channels and signal ($3^{rd}$ transmission over the physical channels in a 3GPP LTE Generation Partnership Project Long Term Evolution) system that is an example of a mobile communication system.

FIG. 2 illustrates physical channels and signal transmission on the physical channels in a 3GPP LTE system that is an example of a mobile communication system.

When a UE is powered on or enters a new cell, the UE performs an initial cell search involving synchronization with an eNB (S201). For the initial cell search, the UE receives a Primary Synchronization CHannel (P-SCH) and a Secondary Synchronization CHannel (S-SCH) from the eNB, and acquires synchronization with the eNB and information such as a cell Identity (ID) from the P-SCH and the S-SCH. Then the UE may receive a Physical Broadcast CHannel (PBCH) from the eNB and acquire broadcast information within a cell from the PBCH. The UE may check a downlink channel state by receiving a downlink reference signal in the initial cell search step.

Upon completion of the initial cell search, the UE may acquire more specific system information by receiving a Physical Downlink Control CHannel (PDCCH) and receiving a Physical Downlink Shared CHannel (PDSCH) according to information carried on the PDCCH (S202).

When the UE initially accesses the eNB or has no radio resources for signal transmission, the UE may perform a random access procedure (S203 to S206). For the random access procedure, the UE may transmit a specific sequence as a preamble on a Physical Random Access CHannel (PRACH) (S203) and receive a response message to the preamble on a PDCCH and a PDSCH corresponding to the PDCCH (S204). If the random access procedure is contention-based, except handover, the UE may additionally perform a contention resolution procedure such as transmission of an additional PRACH (S205) and reception of a PDCCH and a PDSCH corresponding to the PDCCH (S206).

A description will be made of a procedure of transmitting a PDCCH from an eNB to a UE in an LTE system, LTE-A system, etc. The eNB determines a PDCCH format according to Downlink Control Information (DCI) that the ENB will send to the UE, and adds Cyclic Redundancy Check (CRC) to control information. The CRC is masked with an identifier (Radio Network Temporary Identifier (RNTI)) according to the owner or purpose of the PDCCH. If the PDCCH is for a specific UE, the CRC can be masked with the identifier of the UE, e.g., Cell-RNTI (C-RNTI). If the PDCCH is for a paging message, the CRC can be masked with a paging identifier, e.g., Paging-RNTI (P-RNTI). If the PDCCH is for system information, the CRC can be masked with a system information identifier, e.g., System Information-RNTI (SI-RNTI).

The CRC can be masked by a Random Access-RNTI (RA-RNTI) in order to designate a random access response to PRACH preamble transmission of the UE. The following Table 1 shows examples of identifiers masking the PDCCH.

TABLE 1

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

The PDCCH carries control information for the corresponding specific UE when the C-RNTI is used and carries common control information received by all or several UEs in the cell when other RNTIs are used. The eNB performs channel coding on the DCI with the CRC added thereto to generate coded data. The eNB executes rate matching on the basis of the number of CCEs allocated to PDCCH and R-PDCCH formats, and then modulates the coded data to generate modulated symbols. The eNB maps the modulated symbols to physical resource elements.

Downlink control channels used in the 3GPP LTE system include a Physical Control Format Indicator CHannel (PCFICH), Physical Downlink Control CHannel (PDCCH), Physical Hybrid-ARQ Indicator CHannel (PHICH), etc. The PCFICH which is transmitted in the first OFDM symbol of a subframe carries information on the number of OFDM symbols (i.e., a control region size) used for transmission of control channels in the subframe. Control information transmitted on the PDCCH is called Downlink Control Information (DCI). The DCI corresponds to uplink resource allocation information, downlink resource allocation information, and an uplink transmit power control command for UE groups. The PHICH carries an acknowledgement/not-acknowledgement (ACK/NACK) signal in response to an uplink Hybrid Automatic Repeat Request (HARQ). That is, an ACK/NACK signal in response to uplink data sent from the UE is transmitted on the PHICH.

A description will be given of the PDCCH.

An eNB can transmit information regarding resource allocation and transport format of a PDSCH (which may be referred to as DL grant), resource allocation information of a PUSCH (which may be referred to as UL grant), a set of transmit power control commands for an arbitrary UE and individual UEs in a group, activation of Voice over Internet Protocol (VoIP), etc. A plurality of PDCCHs can be transmitted in a control region and a UE can monitor the plurality of PDCCHs. The PDCCH is configured as an aggregation of one or several consecutive Control Channel Elements (CCEs), and can be transmitted through the control region after being subjected to subblock interleaving. A CCE is a logical allocation unit used to provide a coding rate according to radio channel state to the PDCCH. The CCE corresponds to a plurality of resource element groups. A PDCCH format and an available number of bits of the PDCCH are determined on the basis of the correlation between the number of CCEs and a coding rate provided by the CCEs.

Control information transmitted on the PDCCH is called DCI. The following Table 2 shows DCI according to DCI formats.

TABLE 2

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCT format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 conveys uplink resource allocation information, DCI format 1 to DCI format 2 are used to indicate downlink resource allocation information, and DCI format 3 and DCI format 3A indicate an uplink transmit power control (TPC) command for UE groups.

The term eNB used in the present invention includes the concept of a cell or sector. The eNB can be called a cell or a sector when used in the regional concept. A serving eNB (or cell) may be considered as an eNB (or cell) that provides services to UEs and can transmit/receive control information on coordinated multiple transmission points. In this sense, the serving eNB (or cell) may be called an anchor eNB (or cell).

It is possible to improve the communication performance of a UE located at a cell boundary when a coordinated multi-point (CoMP) scheme is used in a multi-cell environment. The CoMP scheme includes Joint Processing (JP) in the form of coordinated MIMO through data sharing, and Coordinated Scheduling/Beamforming (CS/CB) for reducing inter-cell interference, such as worst companion and best companion.

Among these schemes, the CS/CB can mitigate inter-cell interference by transmitting restriction and/or recommendation PMI from a UE to a serving eNB. The worst companion is a scheme in which a UE reports PMI causing the severest interference in cells that perform a CoMP operation to a serving eNB such that corresponding neighboring cells remove inter-cell interference by using PMI other than the PMI. The best companion is a scheme in which the UE reports PMI causing the least interference in cells that perform a CoMP operation to the serving eNB such that corresponding neighbor cells remove inter-cell interference by using PMI corresponding to the PMI.

By using this CoMP system, UEs can be commonly provided with data from a multi-cell eNB. In other words, the communication performance of a UE located at a cell boundary can be improved using the CoMP scheme in a multi-cell environment. A description will be given of embodiments for removing or mitigating inter-heterogeneous cell interference according to the present invention with reference to the attached drawings.

Figure 3:
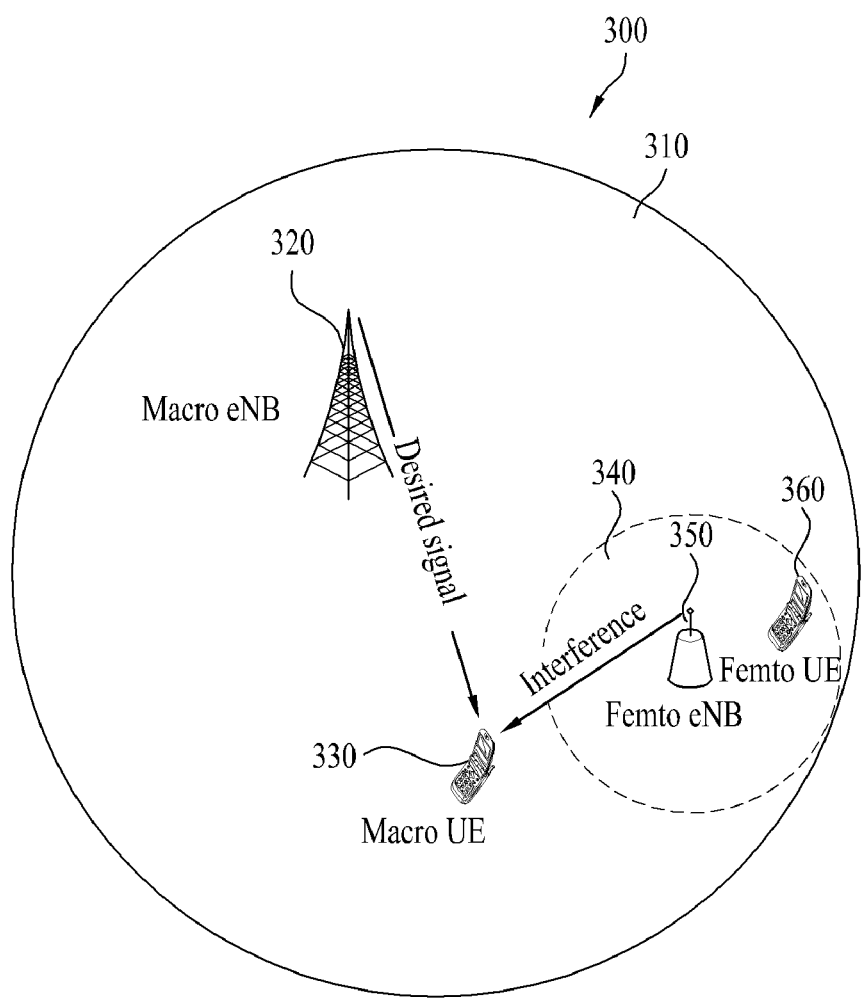
FIG. 3 illustrates an exemplary heterogeneous network 300.

FIG. 3 illustrates an exemplary heterogeneous network 300.

As described above, a heterogeneous network includes various types of cells (e.g. a macro cell, a femto cell, etc.)

which coexist and operate therein, as illustrated in FIG. 3. In the heterogeneous network, many nodes are located in an overlapping manner. Representative examples of the nodes include a pico cell, a micro cell, a femto cell, and a home eNB. In general, the pico cell is used for a zone having high data service demands, the femto cell is used for an indoor office or home, and a wireless relay is used to complement the coverage of a macro cell, but the purposes of these small cells are not limited thereto. The small cells can be classified as a Closed Subscriber Group (CSG) that is available only for specific users according to access restriction, open access that allows access of general users, and hybrid access that uses the two schemes.

Particularly, it is difficult for a femto eNB (or home eNB (HeNB)) 350 to avoid interference according to planned installation because the femto eNB 350 is installed without an additional cell planning procedure of a user. Furthermore, the femto eNB 350 is not directly linked and synchronized with a macro eNB 320 in general, and thus it is difficult for the femto eNB 350 to perform an interference avoidance operation according to direct signal transmission. Accordingly, when the femto eNB 350 is installed in the coverage area of a macro cell 310, a macro UE 330 located in proximity to a femto cell 340 is severely interfered with, resulting in poor communication quality, which is illustrated in FIG. 3. In the environment of FIG. 3, the macro UE 330 is severely interfered with by the femto eNB 350 and thus it may not successfully receive a signal from the macro eNB 320 that is a serving eNB of the macro UE 330.

To solve this interference problem, the present invention can perform a procedure in which a femto UE 360 receives coordination information from the macro eNB 320 and relays the coordination information to the femto eNB 350 such that the femto eNB 350 controls inter-heterogeneous cell interference.

The present invention proposes a method through which the femto eNB 350 transmits a coordination information request message to the macro eNB 320 through the femto UE 360 and the femto UE 360 relays control information (i.e., coordination information) of the macro eNB 320 to the femto eNB 350 to thereby mitigate the interference of the femto cell 340 on the macro cell 310. In the present invention, the coordination information that the femto UE 360 requests to the macro eNB 320 needs to remove inter-heterogeneous cell interference and can be called various terms such as 'inter-ference coordination information'.

Figure 4:
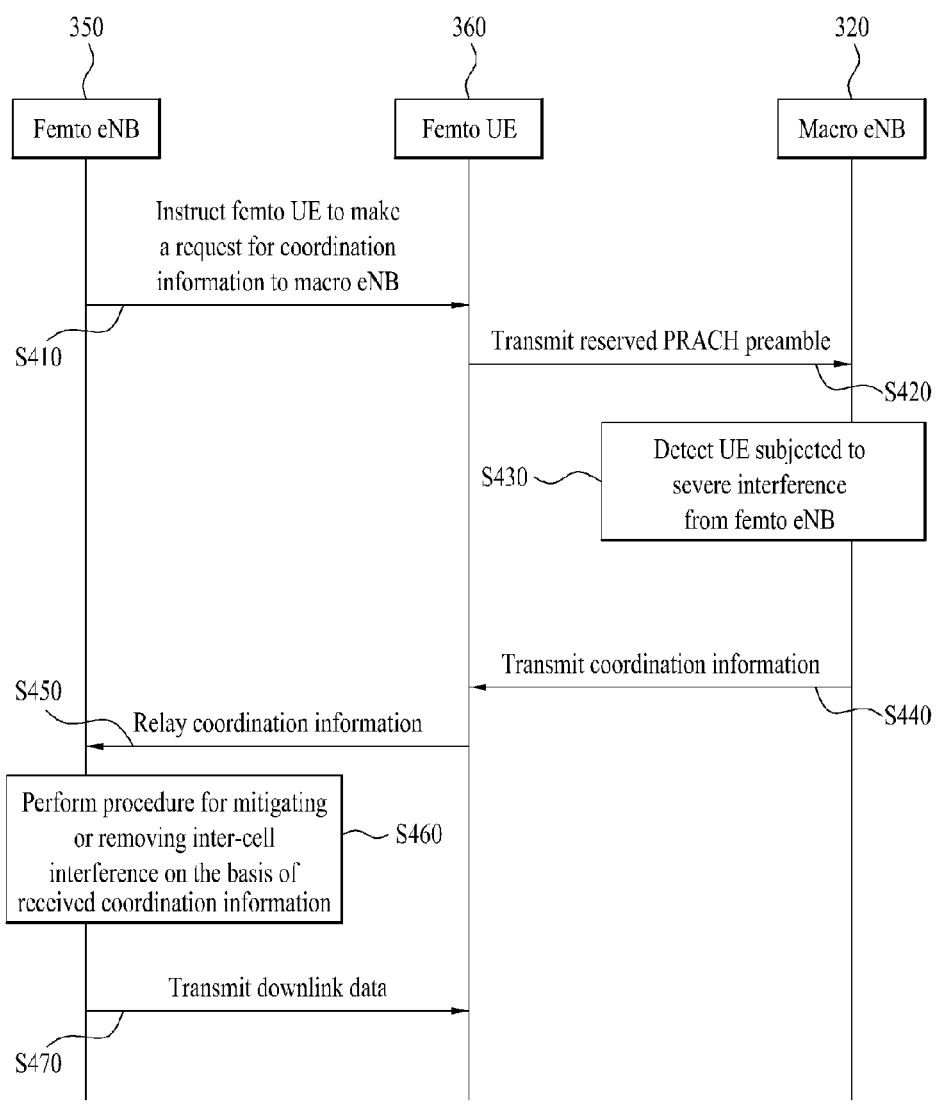
FIG. 4 is a flowchart illustrating an exemplary inter-heterogeneous cell interference coordination procedure in a downlink communication environment according to an embodiment of the present invention.

FIG. 4 is a flowchart illustrating an exemplary inter-heterogeneous cell interference coordination procedure in a downlink communication environment according to an embodiment of the present invention.

The femto cell 340 has a very small number of UEs and aperiodic traffic as compared to the macro cell 310. Accordingly, the femto eNB 350 may transmit no downlink data to the femto UE 360 frequently even when there is no traffic for a predetermined time. During this time, data other than a resource region to which a common reference signal (CRS) of the femto eNB 350 is not allocated does not interfere with the macro cell 310. When there is no traffic of the femto eNB 350, the macro UE 330 can easily mitigate or remove interference of the CRS of the femto eNB 350 by receiving data after puncturing the resource region allocated with the CRS. Hence, it may be desirable to trigger the inter-cell interference control procedure as shown in FIG. 4 only when there is traffic data transmitted by the femto eNB 350. Since the femto eNB 350 has difficulty performing coordinated communication for the macro cell 310 when transmitting a large amount of traffic data, it may be desirable to trigger the inter-cell interference control procedure when a small amount of traffic data is transmitted.

When there is traffic to be transmitted, the femto eNB 350 may instruct the femto UE 360 to make a request for coordination information to the macro eNB 320 (S410). Particularly, when the femto eNB 350 can easily perform coordinated communication for the macro cell 310 because there is a small amount of traffic data to be transmitted, the femto eNB 350 can instruct the femto UE 360 to make a request for the coordination information (S410). In other words, a coordination procedure for controlling inter-cell interference is triggered by the femto eNB 350 in the heterogeneous network 300 in consideration of the traffic of the femto eNB 350. Here, the femto eNB 350 can transmit the request for the coordination information on a PDCCH, for example. The coordination information may include time and frequency resource information of the macro UE 330 that is subjected to interference of a predetermined threshold or higher from the femto eNB 350.

The femto UE 360, which is instructed by the femto eNB 350 to make a request for the coordination information to the macro eNB 320, has difficulty in using a channel for general data or a control signal to request the macro eNB 320 to provide the coordination information. This is because the femto eNB 350 is not synchronized with the macro eNB 320. Accordingly, the femto UE 360 can perform a random access procedure as in the case that the femto UE 360 initially accesses the macro eNB 320 or there is no radio resource for signal transmission. To achieve this, the femto UE 360 can transmit a preamble, which is previously defined for interference coordination information request, to the macro eNB 320 through a Physical Random Access CHannel (PRACH) (S420).

As described above, the PRACH is designed to be used in a state in which an eNB and a UE are not completely synchronized with each other, and thus the PRACH can be effectively used for the femto UE 360 to transmit a signal to the adjacent macro eNB 320 that is not synchronized with the femto UE 360. While an RACH procedure is described as an exemplary procedure for communication between the femto UE 360 and the eNB 320 which are not synchronized with each other, the procedure is not limited to the RACH procedure and can be applied to an available communication channel.

The method by which the femto UE 360 makes a request for the coordination information to the macro eNB 320 through the PRACH is described in more detail. The macro eNB 320 can reserve some of PRACH preambles that will be used by the macro eNB 320 for the interference coordination. For example, when the macro eNB 320 has 64 PRACH preambles #0 to #63, the macro eNB 320 can reserve a specific preamble (e.g. PRACH preamble #63) for the interference coordination. Here, different sequences can be applied to the 64 PRACH preambles to differentiate them from one another. The femto eNB 350 corresponding to the serving eNB of the femto UE 360 can transmit PRACH configuration information of the macro eNB 320 to the femto UE 360 such that the femto UE 360 can effectively deliver the PRACH preamble to the macro eNB 320, which is not illustrated in FIG. 4.

The PRACH configuration information may include the location of PRACH resources of the macro eNB 320, a used PRACH preamble index, PRACH preamble transmit power, etc. The transmission of the PRACH configuration information of the macro eNB 320 and the transmission of the PRACH preamble from the femto UE 360 to the macro eNB 320 may be performed in a manner similar to a handover procedure of conventional systems.

The PRACH preamble reserved for the femto UE 360 to make a request for coordination information for removing inter-cell interference to the macro eNB 320 preferably corresponds to a PRACH preamble other than the PRACH preamble used for initial access of the femto UE 360. This is because, when the macro UE 330 attempts to initially access the macro eNB 320 using the PRACH defined for initial access in FIG. 3, the operation of the macro eNB 320 may be disturbed because the macro eNB 320 has difficulty determining whether the macro UE 330 attempts to access the macro eNB 320 or the femto UE 360 requests the macro eNB 320 to provide the coordination information.

The macro eNB 320 recognizes that the femto eNB 350 makes a request for the coordination information for inter-cell interference coordination when receiving the PRACH preamble (e.g. preamble #63). A description will be made of step S430 in which the macro eNB 320 detects a UE severely interfered with by the femto eNB 350 and generates the coordination information.

When the macro eNB 320 is requested, by the femto UE 360, to transmit the coordination information, the macro eNB detects a UE that is subjected to severe interference of a predetermined threshold or higher from the femto eNB 350 on the basis of a channel state (e.g. Reference Signal Received Power (RSRP)) reported by the macro UE 330. One or more macro UEs measure channel states (e.g. RSRP) between the macro eNB 320 corresponding to a serving eNB and adjacent eNBs (including the femto eNB 350) and the macro UEs so as to check channel intensities (particularly, long term channel intensities) with respect to the eNBs 320 and 350, and report the channel intensities to the macro eNB 320. Then, the macro eNB 320 can regard a macro UE that reports an RSRP exceeding a predetermined threshold as a UE that is subjected to the severest interference from the femto eNB 350 in consideration of low transmit power of the femto eNB 350.

The macro eNB 320 can be aware of information on resources allocated to a macro UE that is subjected to severe interference exceeding the predetermined threshold from the femto eNB 350 from among macro UEs served by the macro eNB 320 and transmit the resource information to the femto UE 360 (S440). If there is no UE that is subjected to severe interference exceeding the threshold from the femto eNB 360, the macro eNB 320 can transmit a message indicating no interference to the femto UE 360 (S440).

Here, the information on resources allocated to the macro UE subjected to severe interference exceeding the threshold is an example of coordination information, and thus the coordination information is not limited thereto and can include information regarding time or frequency resources that can be used (or cannot be used) by a micro cell, a precoding matrix index suitable to be used by the micro cell, appropriate transmit power of the micro cell, etc.

The macro eNB 320 can transmit the interference coordination information through messages on a random access procedure performed after receiving the PRACH preamble using one of the following three schemes.

In the first scheme, upon reception of a first message (i.e., a PRACH preamble reserved for interference coordination information request) from the femto UE 360, the macro eNB 320 transmits, to the femto UE 360, a second message including information on resources allocated to a UE that is subjected to severe interference exceeding a predetermined threshold from the femto eNB 350. FIG. 4 illustrates the first scheme.

In the second scheme, upon reception of the first message (i.e., the PRACH preamble reserved for interference coordination information request) from the femto UE 360, the macro eNB 320 transmits a second message on a general RACH procedure to the femto UE 360 in response to the first message. Upon reception of the second message, the femto UE 360 designates required interference coordination information and transmits a third message carrying the interference coordination information to the macro eNB 320. The interference coordination information may be PMI used by the macro eNB 320 or scheduling information of the macro eNB 320, for example. The third message may include information regarding the cell ID of a micro cell to which the UE, which is subjected to severe interference exceeding the predetermined threshold from the femto eNB 350, belongs, the type of the requested interference coordination information, the quantity of resources required for the micro cell, the number of UEs linked to the micro cell, etc.

Upon reception of the third message, the macro eNB 320 transmits the interference coordination information to the femto UE 360. Then, the femto UE 360 sends an ACK/NACK message that indicates whether or not the third message has been successfully received to the macro eNB 320. Communication between the femto UE 360 and the macro eNB 320 is ended if the femto UE 360 transmits an ACK signal, and a HARQ process may be performed until the coordination information is successfully received if the femto UE 360 transmits a NACK signal.

In the third scheme, upon reception of the first message (i.e., the PRACH preamble reserved for interference coordination information request) from the femto UE 360, the macro eNB 320 transmits a second message on a general RACH procedure to the femto UE 360 in response to the first message. Upon reception of the second message, the femto UE 360 transmits a third message on a general RACH procedure to the macro eNB 320 and receives a fourth message from the macro eNB 320 as a response to the third message.

The femto UE 360 transmits an interference coordination information request signal, as described in the second scheme, to the macro eNB 320 according to an uplink grant included in the fourth message. Upon reception of the interference coordination information request signal, the macro eNB 320 transmits the requested coordination information to the femto UE 360. Then, the femto UE 360 can transmit, to the macro eNB 320, an ACK/NACK message that indicates whether or not the coordination information has been successfully received. Communication between the femto UE 360 and the macro eNB 320 is finished if the femto UE 360 transmits an ACK signal, and a HARQ process may be performed until the coordination information is successfully received if the femto UE 360 transmits a NACK signal.

In the case of the second and third schemes, since the femto UE 360 transmits the interference coordination information request signal after sending the general first message, it is possible to make a request for the coordination information through the first message using a general preamble instead of the reserved preamble (above-mentioned PRACH preamble #63).

In this manner, the femto UE 360 can transmit the coordination information, which has been received from the macro eNB 320 through various methods, to the femto eNB 350 (S450). To achieve this, the femto UE 360 can send a signal representing whether or not the coordination information has been received to the femto eNB 350. This signal can be transmitted through an RACH procedure performed between the femto UE 360 and the femto eNB 350, or a scheduling request.

The femto eNB 350 can mitigate interference caused on the macro cell 310 using the interference coordination information received from the femto UE 360 (S460). That is, the femto eNB 350 can allocate resources using the received interference coordination information in such a manner that the resources do not collide with resources of the macro cell 310 (S460). Through this resource allocation procedure, inter-heterogeneous cell interference generated in the heterogeneous network can be removed. When the interference coordination information received by the femto eNB 350 corresponds to time/frequency resource information of interfered macro UEs, the femto eNB 350 can solve the interference problem by performing scheduling while avoiding the corresponding resource.

The femto eNB 350 can transmit downlink data to the femto UE 360 using time/frequency resources scheduled in step S460. The inter-cell interference can be mitigated or removed through the procedure illustrated in FIG. 4. When the interference is alleviated or removed through the aforementioned coordination procedure, the throughput of a macro UE subjected to interference from the neighboring femto eNB increases so as to improve the communication performance thereof.

However, the macro eNB 320 transmits downlink data at a low throughput before the macro UE 330 feeds back improved Channel Quality Information (CQI) because the macro eNB 320 cannot be aware of whether or not coordination of the femto eNB 350 is provided and advantages owing to coordination. That is, it is impossible to achieve performance improvement owing to coordination for tens of milliseconds as occasion demands when considering a CQI feedback period and feedback delay.

To solve this problem, the femto eNB 350 may additionally transmit a signal indicating whether or not coordination is provided to the macro eNB 320, which is not illustrated in FIG. 4, between steps S460 and S470 of FIG. 4. Then, the femto UE 360 can relay the signal indicating whether or not coordination is provided, received from the femto eNB 350, to the macro eNB 320. For this purpose, a new PRACH preamble may be defined in advance. When the coordination procedure is performed, the macro eNB 320 can increase the level of Modulation and Coding Scheme (MCS) for the macro UE subjected to severe interference exceeding the threshold from the femto eNB 350 and transmit data in the MCS with the improved level.

The inter-heterogeneous cell coordination procedure when one femto cell 340 exists in the macro cell 310 has been described with reference to FIGS. 3 and 4. Based on this, a description will be given of application of the present invention to a case in which two or more femto cells (or eNBs) exist in the macro cell 310.

Figure 5:
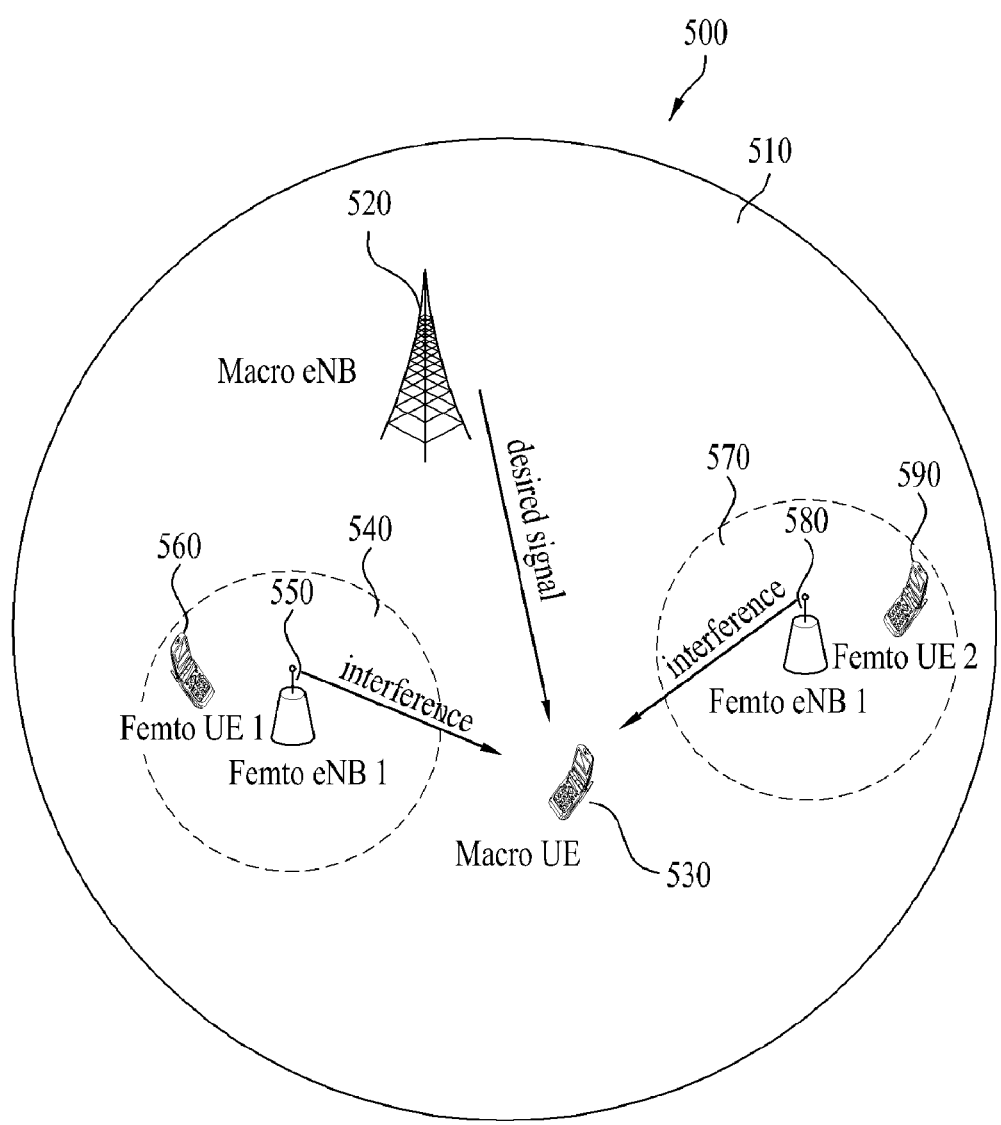
FIG. 5 illustrates an exemplary heterogeneous network 500 including a plurality of femto cells.

FIG. 5 illustrates an exemplary heterogeneous network 500 including a plurality of femto cells.

While FIG. 5 shows the heterogeneous network 500 in which two femto cells 540 and 570 are present, the description with respect to FIG. 5 can be applied to a heterogeneous network including three or more femto cells in the same manner.

A plurality of femto eNBs 550 and 580 can respectively use different PRACH preambles (i.e., different PRACH preamble indexes) to make a request for interference coordination information to a macro eNB 520. Here, the PRACH preamble indexes used for the femto eNBs 550 and 580 to make a request for the coordination information may be preset to different values. When femto eNB 1 (550) and femto eNB 2 (580) exist as the two femto eNBs, PRACH preamble #63 and PRACH preamble #62, for example, can be predefined and reserved for interference coordination information request for femto eNB 1 550 and femto eNB 2 580, respectively.

Accordingly, the macro eNB 520 can distinguish the interference coordination information request from femto eNB 1 550 from the interference coordination information request from femto eNB 2 580. The macro eNB 520 detects macro UEs subjected to interference exceeding a threshold from the femto eNBs 550 and 580. Upon detection of the macro UEs, the macro eNB 520 can transmit, to femto UE 1 550, interference coordination information including information on resources allocated to the UE subjected to interference exceeding the threshold from femto eNB 1 550, and transmit, to femto UE 2 590, interference coordination information including information on resources allocated to the UE subjected to interference exceeding the threshold from femto eNB 2 580. Here, the threshold applied when the UE subjected to interference from femto eNB 1 550 is detected may be equal to or different from the threshold applied when the UE subjected to interference from femto eNB 2 580 is detected.

The femto UE 1 560 and femto UE 2 590 can relay the interference coordination information received from the macro eNB 520 to femto eNB 1 550 and femto eNB 2 580, respectively.

In the heterogeneous network 500 including the plurality of femto cells 540 and 570, an inter-cell interference coordination procedure can be performed using the second and third schemes for transmitting interference coordination information, described in step S440 of FIG. 4. Specifically, after transmitting the first message on the RACH procedure, the femto UEs 560 and 590 can send interference coordination information including IDs of the serving femto cells 550 and 580 to the macro eNB 520 such that the macro eNB 520 can discriminate femto eNB 1 550 and femto eNB 2 580 from each other.

The method for solving the inter-heterogeneous cell interference coordination problem in a downlink communication environment has been described. The above-mentioned inter-cell downlink interference coordination procedure can be employed to remove interference in an uplink communication environment. In the case of uplink, as shown in FIG. 3, the macro UE 330 located in proximity to the femto eNB 350 severely interferes with the femto eNB 350. A description will be made of a coordination procedure for mitigating inter-heterogeneous cell interference in an uplink communication environment with reference to the attached drawings.

Figure 6:
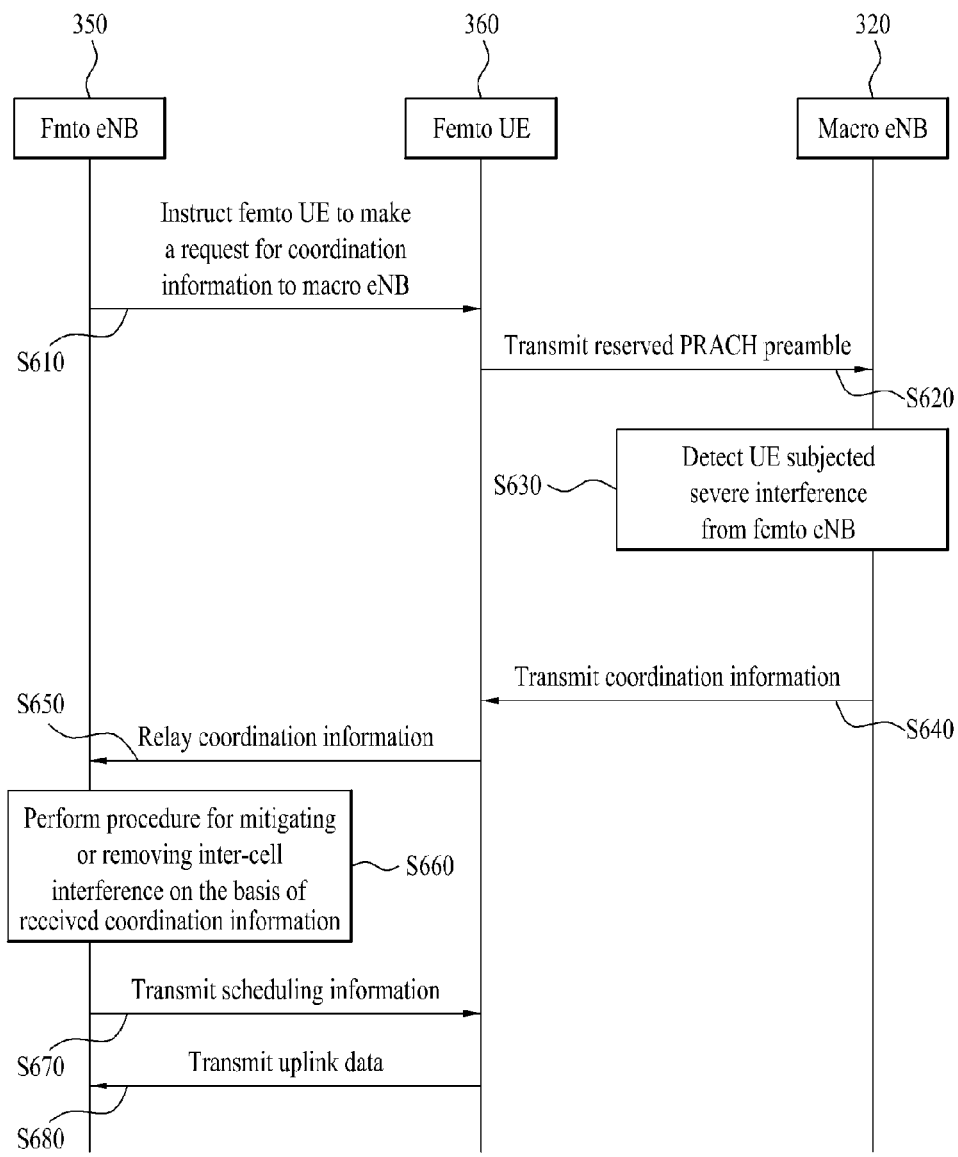
FIG. 6 is a flowchart illustrating an exemplary inter-heterogeneous cell interference coordination procedure in an uplink communication environment according to an embodiment of the present invention.

FIG. 6 is a flowchart illustrating an exemplary inter-heterogeneous cell interference coordination procedure in an uplink communication environment according to an embodiment of the present invention.

Referring to FIG. 6, the inter-cell interference coordination procedure in uplink is considerably similar to the inter-cell interference coordination procedure in downlink. Like the downlink interference coordination procedure shown in FIG. 4, the femto eNB 350 can instruct the femto UE 360 to make a request for coordination information to the macro eNB 320 when there is traffic to be transmitted (S610). The femto UE 360 can transmit a preamble predefined for an uplink interference coordination information request to the macro eNB 320 through a PRACH (S620). In this case, different PRACH preambles need to be defined and reserved in order to discriminate the uplink interference coordination information request from a downlink interference coordination information request. The femto UE 360 can make a request for uplink interference coordination information to the macro eNB 320 through the PRACH preamble predefined for the uplink interference coordination information request.

Upon reception of an uplink interference coordination information request signal from the femto UE 360, the macro eNB 320 checks time and frequency resource information of macro UEs that exert severe interference exceeding a predetermined threshold on the femto cell 340 (S630). Then, the macro eNB 320 transmits uplink interference coordination information to the femto UE 360 (S640). Here, the transmitted uplink interference coordination information includes the time/frequency resource information of the macro UEs that exert severe interference exceeding the predetermined threshold on the femto cell 340.

The femto UE 360 can relay the uplink interference coordination information received from the macro eNB 320 to the femto eNB 350 (S650). The femto eNB 350 performs a scheduling procedure using the received uplink interference coordination information to avoid time/frequency resources of the macro UEs that exert severe interference exceeding the threshold on the femto eNB 350 (S660).

The femto eNB 350 transmits scheduling information to femto UEs including the femto UE 360, which are located within the femto cell 340 (S670). The femto UEs can transmit uplink data to the femto eNB 350 on the basis of the received scheduling information (S680). The uplink interference problem can be solved by performing the uplink interference coordination procedure in this manner.

While FIG. 4 illustrates the downlink interference coordination procedure, this procedure is applicable to the procedure illustrated in FIG. 6, except processes particularly mentioned in FIG. 6.

Sharing of coordination information between the heterogeneous cells 310 and 340 in the aforementioned coordination procedure for removing or mitigating inter-cell interference is achieved through a PRACH between the femto UE 360 and the macro eNB 320 in the above description. However, to use this random access procedure for purposes other than handover may disturb system optimization and system operation. Therefore, the present invention proposes the following new method for reducing the level of dependence on the random access procedure in sharing coordination information.

Figure 7:
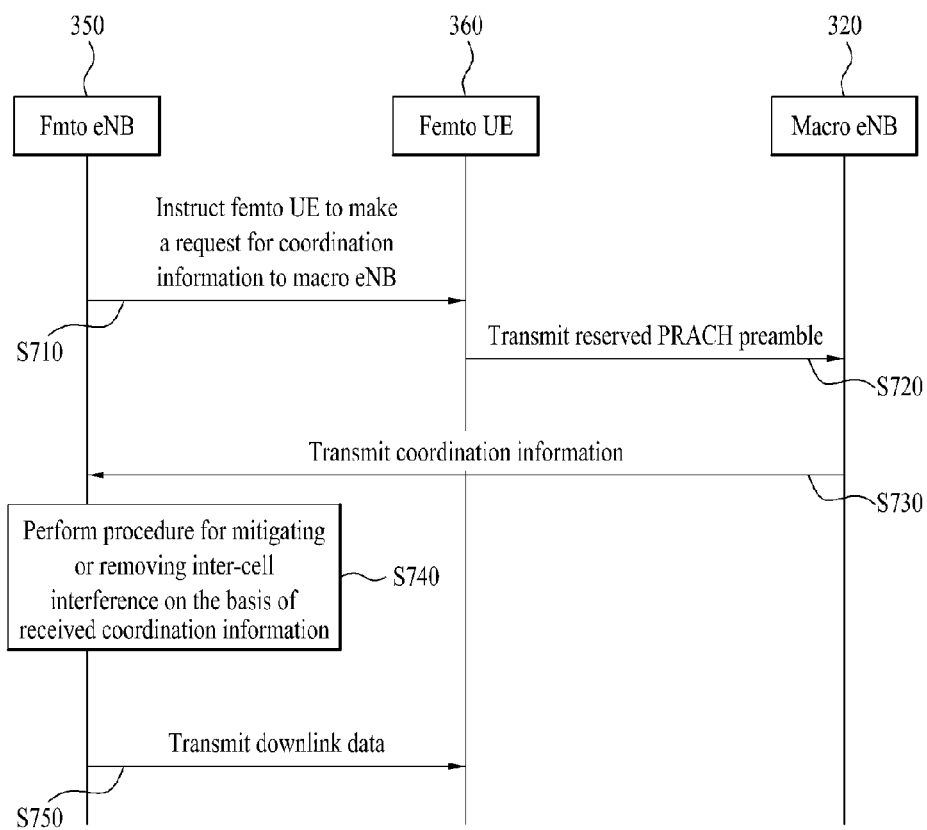
FIG. 7 is a flowchart illustrating an exemplary inter-heterogeneous cell interference coordination procedure according to another embodiment of the present invention.

FIG. 7 is a flowchart illustrating an exemplary inter-heterogeneous cell interference coordination procedure according to another embodiment of the present invention.

The procedure by which the femto UE 360 makes a request for interference coordination information to the macro eNB 320 through a PRACH in an initial coordination step is similar to the above-mentioned procedure. That is, the femto eNB 350 can instruct the femto UE 360 to make a request for interference coordination information to the macro eNB 320 if there is traffic to be transmitted (S710).

The femto UE 360 can transmit a preamble predefined for the interference coordination information request to the macro eNB 320 through a PRACH (S720). A procedure of transmitting the interference coordination information to the femto eNB 350 can be performed through a radio channel between the femto UE 360 and the macro eNB 320. Upon reception of the coordination information request from the femto UE 360, the macro eNB 320 generates the coordination information as shown in FIG. 4.

The macro eNB 320 directly transmits the interference coordination information to the femto eNB 350 through the radio channel (S730). To achieve this, a new control channel is needed between the macro eNB 320 and the femto eNB 350, and the control channel can be generated according to the following method.

When requested to provide the interference coordination information, the macro eNB 320 communicates with the femto eNB 350 using predefined radio resources. For this operation, some of downlink resources of the macro eNB 320 can be predefined for communication with the femto eNB 350 rather than operation of the macro cell 310, and the femto eNB 350 can receive coordination information coming from the predefined radio resources (S730).

The radio resources predefined between the macro eNB 320 and the femto eNB 350 can be determined statically, semi-statically or dynamically according to determination frequency. When the radio resources are determined semi-statically, the macro eNB 320 and the femto eNB 350 use static radio resources for hundreds or thousands of milliseconds. When the radio resources are determined dynamically, the femto UE 360 can makes a request for the coordination information to the macro eNB 320, as shown in FIG. 4, and at the same time, can signal, to the macro eNB 320, a resource region through which the femto eNB 350 receives the coordination information.

In other words, the femto UE 360 that has succeeded in RACH access through a previously reserved preamble can signal radio resource information received from the femto eNB 350 to the macro eNB 320 through the third message on the RACH procedure, which is delivered according to the second method of FIG. 4. The predefined radio resources can designate a specific subframe or a specific resource block of a subframe. The macro eNB 320 can periodically transmit the interference coordination information to the femto eNB 350 through the predefined radio resources.

The femto eNB 350 can interrupt downlink transmission thereof in order to receive the coordination information from the macro eNB 320 through the previously determined radio resources. For example, when a subframe through which the interference coordination information is received from the macro eNB 320 is set to a Multicast Broadcast Single Frequency Network (MBSFN) subframe, the femto cell does not transmit a downlink signal through the MBSFN subframe to the femto UE 360 in OFDM symbols following OFDM symbols used for PDCCH transmission and can receive a signal only from the macro eNB 320.

To help this operation, the femto eNB 350 can align the subframe boundary thereof with the subframe boundary of the macro eNB 320 to synchronize the subframe boundaries with each other, include information about the number of OFDM symbols to be used for PDCCH transmission and/or the number of antenna ports of the femto eNB 350 in the interference coordination information request delivered through the femto UE 360, and transmit the interference coordination information request including the information. If the femto eNB 350 cannot successfully perform synchronization due to propagation delay with respect to the macro eNB 320, or longer than a predetermined time is required for transmission/reception mode conversion of the femto eNB 350, OFDM symbols corresponding to the front part and/or the rear part of the interference coordination information transmitted from the macro eNB 320 to the femto eNB 350 can be set to a guard interval in which no signal is transmitted.

Upon reception of the interference coordination information from the macro eNB 320, the femto eNB 350 sends an ACK/NACK signal to the macro eNB 320 through the femto UE 360. The macro eNB 320 can perform a HARQ procedure until the femto eNB 350 successfully receives the interference coordination information upon reception of the ACK/NACK signal.

Subsequently, the femto eNB 350 performs scheduling in order to remove or mitigate inter-cell interference on the basis of the received interference coordination information (S740).

After scheduling, the femto eNB 350 transmits downlink data in scheduled time/frequency resources to the femto UE 360 (S750).

The aforementioned schemes require transmission and reception of at least 3 hops to perform bidirectional communication in which the femto eNB 350 makes a request for coordination information to the macro eNB 320 through the femto UE 360 and receives the coordination information. Accordingly, a simpler scheme for reducing this system overhead is described below.

Figure 8:
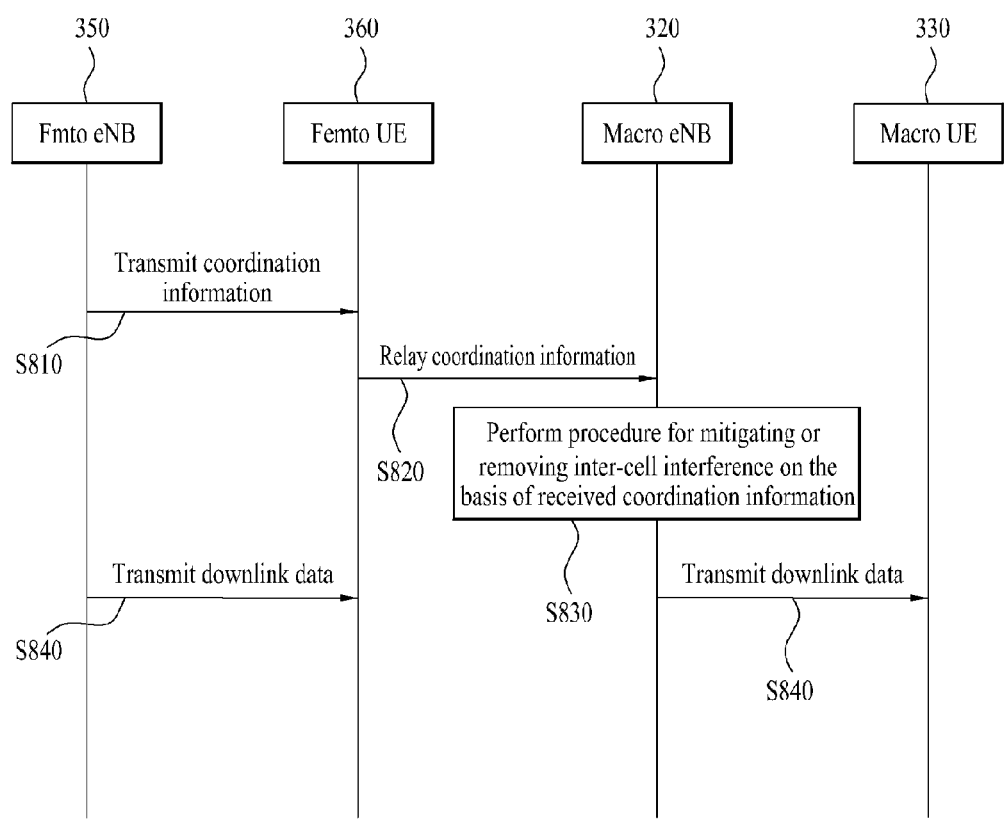
FIG. 8 is a flowchart illustrating an exemplary inter-heterogeneous cell interference coordination procedure according to another embodiment of the present invention.

FIG. 8 is a flowchart illustrating an exemplary inter-heterogeneous cell interference coordination procedure according to another embodiment of the present invention.

The present embodiment uses a unidirectional transmission/reception scheme in which the femto eNB 350 delivers coordination information thereof to the macro eNB 320 through the femto UE 360 rather than making a request for coordination information to the macro eNB 320, and ends the communication.

Referring to FIG. 8, the femto eNB 350 transmits coordination information on a PDCCH or PDSCH to the femto UE 360 (S810). Here, the transmitted interference coordination information may include scheduled time/frequency resource information or PMI and information required for coordination. In order for the femto eNB 360 to distinguish data or control information thereof from the interference coordination information, the following schemes can be considered.

The interference coordination information transmitted on a PDCCH is encoded/decoded using reserved third PMI instead of RNTI of the femto UE 360. Otherwise, it is possible to transmit additional information such as an interference coordination information flag while using the RNTI of the femto UE 360 so as to determine whether or not corresponding information is the interference coordination information. For example, decoded information corresponds to interference coordination information if the interference coordination information flag is 1 and corresponds to information of the femto UE 360 if it is not. When the interference coordination information is transmitted on a PDSCH, the femto UE 360 can also determine whether the information on the PDSCH is interference coordination information or not through reserved RNTI or the interference coordination information flag.

The femto UE 360 can transmit the received interference coordination information to the macro eNB 320 according to the above-mentioned RACH procedure (S820). For example, the femto UE 360 can transmit a predefined and reserved PRACH preamble to the macro eNB 320, and then relay the interference coordination information to the macro eNB 320 through a RACH procedure consisting of three steps. Alternately, after notifying the macro eNB 320 of transmission of the interference coordination information through a predefined and reserved PRACH preamble, the femto eNB 350 can transmit the interference coordination information through a radio resource agreed between the femto eNB 350 and the macro eNB 320 without a discussion with the macro eNB 320.

Upon recognition of the previously reserved PRACH preamble, the macro eNB 320 can determine whether or not the radio resource agreed for the interference coordination information is used, and then receive the interference coordination information or not. When the macro eNB 320 receives the interference coordination information, the macro eNB 320 can perform coordination communication using the received interference coordination information (S830). That is, the macro eNB 320 can perform a scheduling procedure for mitigating or removing inter-cell interference on the basis of the received interference coordination information (S830). For example, the macro eNB 320 can remove or mitigate the inter-cell interference by performing scheduling for the macro UE 330 located in proximity to the femto cell 340, avoiding time/frequency resources notified by the femto eNB 350, or estimating an effective channel (a channel between the macro UE 330 and the femto eNB 350, which is preprocessed by precoding of the femto eNB 350) between the macro UE 330 and the femto eNB 350 and applying precoding orthogonal to an interference signal.

Upon completion of the coordination procedure for removing or mitigating the inter-cell interference, the femto eNB 350 and the macro eNB 320 transmit downlink data to the femto UE 360 and the macro UE 330, respectively (S840).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method and apparatus for removing inter-heterogeneous cell interference can be applied to wireless communication systems such as 3GPP LTE, LTE-A, IEEE 802, etc.

What is claimed is:

1. A method for removing inter-heterogeneous cell interference, the method performed by a femto user equipment (UE) and comprising:
   receiving, from a femto evolved Node B (eNB) which is a serving eNB, a signal for instructing that a request for interference coordination information required for inter-heterogeneous cell interference coordination to a macro eNB, when a traffic data to be transmitted from the femto eNB to the femto UE exists and an amount of the traffic data is smaller than a predetermined threshold;
   transmitting, to the macro eNB, a predetermined physical random access channel (PRACH) preamble which notifies the request through a PRACH;
   receiving, from the macro eNB, the interference coordination information; and
   transmitting, to the femto eNB, the received interference coordination information,
   wherein the femto eNB is heterogeneous to the macro eNB.

2. The method according to claim 1, wherein the interference coordination information comprises information on time and frequency resources allocated to a macro UE, which is subjected to interference of a predetermined threshold or higher from the first femto eNB, from among one or more macro UEs served by the macro eNB.

3. The method according to claim 2, further comprising:
receiving downlink data from the femto eNB through a resource region corresponding to time and frequency resources which are scheduled by the femto eNB on the basis of the interference coordination information.

4. The method according to claim 1, wherein the predetermined PRACH preamble is allocated dedicatedly for the femto UE.

5. A method for removing inter-heterogeneous cell interference, the method performed by a femto evolved Node B (eNB) and comprising:
transmitting, to a femto user equipment (UE) served by the femto eNB, a signal for instructing that a request for interference coordination information required for inter-heterogeneous cell interference coordination to a macro eNB, when a traffic data to be transmitted from the femto eNB to the femto UE exists and an amount of the traffic data is smaller than a predetermined threshold;
receiving, from the femto UE, the interference coordination information; and
performing, a scheduling for one or more femto UEs on the basis of the received interference coordination information,
wherein the femto eNB is heterogeneous to the macro eNB.

6. The method according to claim 5, wherein the interference coordination information comprises information on time and frequency resources allocated to a macro UE, which is subjected to interference of a predetermined threshold or higher from the femto eNB, from among one or more macro UEs served by the macro eNB.

7. The method according to claim 6, further comprising:
transmitting downlink data to the femto UE through a resource region corresponding to time and frequency resources which are scheduled by the femto eNB on the basis of the interference coordination information.

8. A femto user equipment (UE) for removing inter-heterogeneous cell interference, the femto UE comprising:
a transmitter;
a receiver; and
a processor,
wherein the processor is configured to:
receive, from a femto evolved Node B (eNB) which is a serving eNB, a signal for instructing that a request for interference coordination information required for inter-heterogeneous cell interference coordination be made to a macro eNB, when a traffic data to be transmitted from the femto eNB to the femto UE exists and an amount of the traffic data is smaller than a predetermined threshold, through the receiver,
transmit, to the macro eNB, a predetermined PRACH preamble which notifies the request through a PRACH, through the transmitter,
receive the interference coordination information from the macro eNB, through the receiver, and
transmit the received interference coordination information to the femto eNB, through the transmitter,
wherein the femto eNB is heterogeneous to the macro eNB.

9. The femto UE according to claim 8, wherein the interference coordination information comprises information on time and frequency resources allocated to a macro UE, which is subjected to interference of a predetermined threshold or higher from the femto eNB, from among one or more macro UEs served by the macro eNB.

10. The femto UE according to claim 9, wherein the processor is further configured to receive downlink data from the femto eNB through a resource region corresponding to time and frequency resources which are scheduled by the femto eNB on the basis of the interference coordination information, through the receiver.

11. A femto evolved Node B (eNB) for removing inter-heterogeneous cell interference, the femto eNB comprising:
a transmitter;
a receiver; and
a processor,
wherein the processor is configured to:
transmit, to a femto user equipment (UE) served by the femto eNB, a signal for instructing that a request for interference coordination information required for inter-heterogeneous cell interference coordination to a macro eNB, when a traffic data to be transmitted from the femto eNB to the femto UE exists and an amount of the traffic data is smaller than a predetermined threshold, through the transmitter,
receive a receiver configured to receive the interference coordination information from the femto UE, through the receiver, and
perform a scheduling for one or more femto UEs on the basis of the received interference coordination information,
wherein the femto eNB is heterogeneous to the macro eNB.

12. The femto eNB according to claim 11, wherein the interference coordination information comprises information on time and frequency resources allocated to a macro UE, which is subjected to interference of a predetermined threshold or higher from the femto eNB, from among one or more macro UEs served by the macro eNB.

13. The femto eNB according to claim 12, wherein the processor is further configured to:
transmit downlink data to the femto UE through a resource region corresponding to time and frequency resources which are scheduled on the basis of the interference coordination information, through the transmitter.

* * * * *